United States Patent
Chen

(10) Patent No.: US 12,155,247 B2
(45) Date of Patent: Nov. 26, 2024

(54) AUTOMATIC POWER-OFF CIRCUIT AND AUTOMATIC POWER-OFF METHOD

(71) Applicant: KINPO ELECTRONICS, INC., New Taipei (TW)

(72) Inventor: Yung-Ming Chen, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 503 days.

(21) Appl. No.: 17/687,172

(22) Filed: Mar. 4, 2022

(65) Prior Publication Data

US 2023/0208161 A1    Jun. 29, 2023

(30) Foreign Application Priority Data

Dec. 27, 2021   (CN) .......................... 202111613444.9

(51) Int. Cl.
*H02J 7/00*   (2006.01)

(52) U.S. Cl.
CPC .......... *H02J 7/0031* (2013.01); *H02J 7/0068* (2013.01)

(58) Field of Classification Search
CPC ......... H02J 7/0031; H02J 7/0068; H02J 9/005
See application file for complete search history.

(56) References Cited

U.S. PATENT DOCUMENTS

| | | | | |
|---|---|---|---|---|
| 7,135,838 B2* | 11/2006 | Young | ................... | H02J 7/0068 320/128 |
| 7,669,065 B2* | 2/2010 | Pan | ................... | H02J 13/00036 327/365 |
| 8,581,556 B2* | 11/2013 | Shibata | ................. | H01M 10/46 320/134 |
| 9,128,706 B2* | 9/2015 | Fiebrich | .................. | G06F 1/266 |
| 9,844,109 B2* | 12/2017 | Lee | ....................... | H05B 47/195 |
| 9,859,724 B2* | 1/2018 | Choi | ...................... | H02J 7/0063 |
| 11,482,764 B2* | 10/2022 | Suzuki | ....................... | H02J 7/00 |
| 2002/0027426 A1* | 3/2002 | Okahara | ................... | H02J 7/24 322/28 |
| 2004/0004463 A1* | 1/2004 | Young | ................... | H02J 7/0068 320/134 |
| 2007/0262805 A1* | 11/2007 | Hashimoto | ............... | G06F 1/28 327/296 |
| 2008/0007304 A1* | 1/2008 | Yang | ......................... | G05F 1/56 327/34 |

(Continued)

*Primary Examiner* — Daniel Kessie
*Assistant Examiner* — Brian K Baxter
(74) *Attorney, Agent, or Firm* — Muncy, Geissler, Olds & Lowe, P.C.

(57) ABSTRACT

An automatic power-off circuit automatically disconnects a path between a battery and a load after the battery supplying power to the load for a specific time period. The automatic power-off circuit includes a first switch, a first capacitor, a first reverse circuit, a timing circuit, and a logic circuit. The first reverse circuit provides a first signal reversed to a potential change based on the potential change of the first capacitor. The timing circuit provides a second signal with the first potential to the logic circuit based on the first signal with the first potential, and adjusts the second signal with the second potential after the specific time period. The logic circuit turns on the first switch based on the second signal with the first potential, and turns off the first switch based on the second signal with the second potential.

15 Claims, 4 Drawing Sheets

(56) References Cited

U.S. PATENT DOCUMENTS

| | | | | |
|---|---|---|---|---|
| 2008/0197707 A1* | 8/2008 | Chi Yang | H02J 7/0068 | 320/162 |
| 2009/0009135 A1* | 1/2009 | Wong | H02J 7/0031 | 320/134 |
| 2010/0109441 A1* | 5/2010 | Gagne | H03K 19/0016 | 307/80 |
| 2011/0025278 A1* | 2/2011 | Balakrishnan | H02M 1/32 | 320/166 |
| 2011/0127965 A1* | 6/2011 | Yen | H02J 7/007 | 320/128 |
| 2011/0179292 A1* | 7/2011 | Clegg | G06F 1/26 | 713/300 |
| 2012/0112564 A1* | 5/2012 | Wu | H02M 1/44 | 307/326 |
| 2012/0169292 A1* | 7/2012 | Cantin | H02J 7/00308 | 320/135 |
| 2013/0242626 A1* | 9/2013 | Li | G02B 9/02 | 307/326 |
| 2014/0145510 A1* | 5/2014 | Pubert | H03K 17/28 | 307/81 |
| 2015/0028820 A1* | 1/2015 | Lin | G06F 1/263 | 320/166 |
| 2016/0218521 A1* | 7/2016 | Huang | H02J 7/0068 | |
| 2017/0033585 A1* | 2/2017 | Niki | H02J 7/00306 | |
| 2018/0069470 A1* | 3/2018 | Chang | H02M 3/04 | |
| 2018/0152027 A1* | 5/2018 | Peng | B60L 58/12 | |
| 2018/0260019 A1* | 9/2018 | Kim | G06F 1/3287 | |
| 2018/0278076 A1* | 9/2018 | Chen | H02J 7/007182 | |
| 2019/0027945 A1* | 1/2019 | Gagnon | H02J 7/0034 | |
| 2019/0348846 A1* | 11/2019 | El Markhi | H02J 7/0031 | |
| 2020/0142005 A1* | 5/2020 | Yen | H01M 10/44 | |
| 2020/0386826 A1* | 12/2020 | Chiu | G01R 19/0069 | |
| 2021/0210969 A1* | 7/2021 | Sun | H02J 7/00304 | |
| 2022/0216719 A1* | 7/2022 | Tong | H02J 7/007182 | |
| 2024/0128972 A1* | 4/2024 | Wakazono | H03K 17/0822 | |

\* cited by examiner

AUTOMATIC POWER-OFF CIRCUIT AND AUTOMATIC POWER-OFF METHOD

BACKGROUND

Technical Field

The present disclosure relates to an automatic power-off circuit and an automatic power-off method, and more particularly to an automatic power-off circuit and an automatic power-off method suitable for a washing machine.

Description of Related Art

The statements in this section merely provide background information related to the present disclosure and do not necessarily constitute prior art.

Due to the increasing popularity of electronic products today, more and more household electronic products have come out, especially with the rapid development of household electronic products, more and more electronic products, for example, but not limited to, dishwashers, electric toothbrushes, washing machines, etc. that can replace manual work have been developed. In particular, in addition to replacing the manual work of hands, the face washing machine can also rely on the function of vibration to deeply clean the skin. Therefore, in addition to replacing hands, additional product functions are added, making the popularity of face wash machines higher and higher.

The vibration deep cleaning function of the face washing machine mainly relies on the motor to perform, but it is not necessary to continuously vibrate during the face washing process to have a deep cleaning effect. Specifically, washing machines usually only need a short period of time to generate the vibration function to have a deep cleaning effect. If the vibration is too long or the vibration time is not enough, it will cause excessive cleaning or insufficient cleaning. Therefore, after the conventional face washing machine is used for a sufficient time, it must be manually turned off to stop the motor from rotating. However, users usually do not pay special attention to the length of time in order to avoid the occurrence of the above-mentioned situations, which often easily causes the above-mentioned negative effects to occur. On the other hand, if the motor continues to run without proper stop, the effect of benefiting the skin cannot be achieved. Therefore, if the motor runs for too long, it will cause a waste of electricity, and it is easy to reduce the life span of the washing machine.

SUMMARY

In order to solve the above-mentioned problems of existing technology, the present disclosure provides an automatic power-off circuit. The automatic power-off circuit is coupled between a battery and a load, and automatically disconnects a path between the battery and the load after the battery supplies power to the load for a specific time period. The automatic power-off circuit includes a first switch, a first reverse circuit, a logic circuit, and a second switch. The first switch is coupled to the battery and the load. The first reverse circuit includes an input end coupled to the battery, the first switch, and a first capacitor, and an output end coupled to a timing circuit. The first reverse circuit provides a first signal reversed to a potential change based on the potential change of the first capacitor. The logic circuit includes an input end coupled to the timing circuit, and an output end coupled to the first switch and the first reverse circuit. The second switch includes a first end coupled to the input end of the first reverse circuit, and a second end coupled to a second capacitor. The second switch is turned on based on a trigger, and a potential of the second capacitor is changed based on the turned-on second switch. The timing circuit provides a second signal with a first potential to the logic circuit based on the first signal with the first potential, and the timing circuit adjusts the second signal with the second potential after the specific time period. The logic circuit turns on the first switch based on the second signal with the first potential and turns off the first switch based on the second signal with the second potential.

In order to solve the above-mentioned problems of existing technology, the present disclosure provides an automatic power-off method of an automatic power-off circuit. The automatic power-off circuit is coupled between a battery and a load, and the automatic power-off circuit includes a first switch, a first capacitor, a first reverse circuit, a timing circuit, and a logic circuit. The automatic power-off method includes steps of: (a) charging the first capacitor from a second potential base on a connection of the battery, (b) providing, by the first reverse circuit, a first signal with a first potential based on the first capacitor with the second potential, (c) providing, by the timing circuit, a second signal with the first potential to the logic circuit based on the first signal with the first potential, (d) turning on, by the logic circuit, the first switch based on the second signal with the first potential, (e) timing a specific time period, by the timing circuit, and adjusting the second signal with the second potential after the specific time period, and (f) turning off, by the logic circuit, the first switch based on the second signal with the second potential.

One of the exemplary embodiments, the automatic power-off circuit shorts the path between the battery and the motor for a short time period (i.e., the specific time period) when the battery is installed in the washing machine or when the user needs to use the washing machine. After the specific time period expires, the path between the battery and the motor is automatically disconnected so as to achieve the effect of taking into account the cleaning ability of the washing machine and saving the power consumption of the battery.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
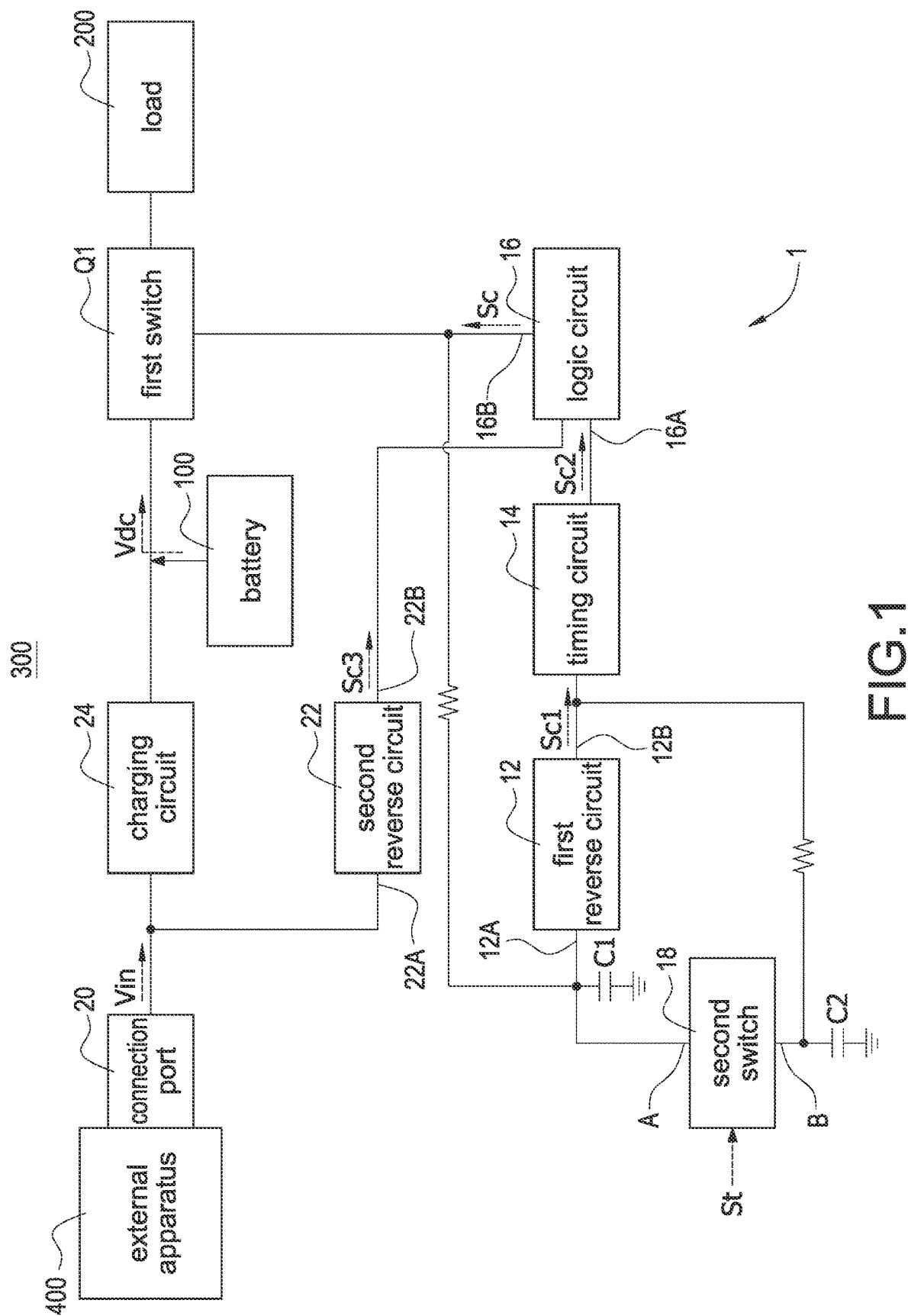
FIG. 1 is a block diagram of an automatic power-off circuit suitable for a washing machine according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an automatic power-off circuit suitable for a washing machine according to the present disclosure. The automatic power-off circuit 1 is coupled between a battery 100 and a load 200. In particular, the load 200 may be a motor of, for example, but not limited to, a washing machine 300. The battery 100 is used to provide a DC voltage Vdc to supply power to the motor. When a path between the battery 100 and the motor is shorted, the motor is driven by receiving the DC voltage Vdc. Otherwise, when the path is disconnected, the motor stops rotating. When the battery 100 is installed in the washing machine or when the user needs to use the washing machine, the automatic power-off circuit 1 is used to short the path between the battery 100 and the motor for a short time period (i.e., a specific time period). After the specific time period expires (ends), the path between the battery 100 and the motor is automatically disconnected so as to increase a price/performance ratio of the washing machine 300, that is, to achieve the effect of taking into account the cleaning ability of the washing machine, saving the power consumption of the battery 100, and increasing the life span of the washing machine 300.

The automatic power-off circuit 1 includes a first switch Q1, a first reverse circuit 12, a first capacitor C1, a timing circuit 14, a logic circuit 16, a second switch 18, and a second capacitor C2. The first switch Q1 is coupled between the battery 100 and the load 200 to connect or disconnect a path between the battery 100 and the load 200 by turning on or turning off the first switch Q1. The first reverse circuit 12 includes an input end 12A and an output end 12B. The input end 12A is coupled to the battery 100, the first switch Q1, and the first capacitor C1. The first reverse circuit 12 provides a first signal Sc1 reversed to a potential change based on the potential change of the first capacitor C1. The timing circuit is coupled to the output end of the first reverse circuit. The logic circuit includes an input end and an output end. In particular, the potential change refers to the change in stored voltage. The timing circuit 14 is coupled to the output end 12B of the first reverse circuit 12, and provides a second signal Sc2 with the first potential to the logic circuit 16 based on the first signal Sc1 with the first potential (such as a high potential). Afterward, the timing circuit 14 automatically times the specific time period, and after the specific time period, the timing circuit 14 adjusts the second signal Sc2 from the first potential to a second potential (such as a low potential).

The logic circuit 16 includes an input end 16A and an output end 16B. The input end 16A is coupled to the timing circuit 14, and the output end 16B is coupled to the first switch Q1 and the input end 12A of the first reverse circuit 12. The logic circuit 16 turns on the first switch Q1 by the second signal Sc2 with the first potential, and turns off the first switch Q1 by the second signal Sc2 with the second potential. The first switch Q1 may be a semiconductor switch, for example, but not limited to, a transistor. The second switch 18 includes a first end A and a second end B. The first end A is coupled to the input end 12A of the first reverse circuit 12, and the second end B is coupled to the second capacitor C2 and the output end 12B of the first reverse circuit 12. The second switch 18 may be a manually controllable switch, such as a tact switch, a push button switch, or the like, which is turned on by man-made trigger St so that the second capacitor C2 changes the potential of the first capacitor C1 based on the turned-on second switch 18.

Specifically, the second switch 18 changes the potential of the first signal Sc1 outputted by the first reverse circuit 12 mainly based on the man-made trigger St. After the potential of the first signal Sc1 is changed, the timing circuit 14 automatically times a specific time period. After the specific time period, the timing circuit 14 changes the potential of the first signal Sc1 back to the potential when the second switch 18 is not triggered so that the logic circuit 16 turns on or turns off the first switch Q1 accordingly. Therefore, the automatic power-off circuit 1 can be automatically turned on or turned off to connect or disconnect a path between the battery 100 and the load 200.

In one embodiment, the first potential refers to a high potential, and the second potential refers to a low potential, but it is not limited thereto. The signal potential is mainly for each circuit or component to determine and execute corresponding control, and therefore it may be adjusted according to the characteristics of the circuit. For example, the logic circuit 16 can turn on the first switch Q1 by the second signal Sc2 with a low potential (instead of the original high potential) and turn off the first switch Q1 by the second signal Sc2 with a high potential (instead of the original low potential). On the other hand, the first potential and the second potential referred to by each circuit or component may be the same or different. For example, the first potential indicated by the first reverse circuit 12 may be 12 volts, but the first potential indicated by the logic circuit 16 may be 5 volts.

Please refer to FIG. 1 again, the automatic power-off circuit 1 further includes a connection port 20, a second reverse circuit 22, and a charging circuit 24. The connection port 20 is used to couple an external apparatus 400, for example, but not limited to, a device used to provide charging power, such as a charger, to receive an input voltage Vin provided from the external apparatus 400. In particular, the connection port 20 may be, for example, but not limited to, a USB-type interface. The second reverse circuit 22 includes an input end 22A and an output end 22B. The input end 22A is coupled to the connection port 20, and the output end 22B is coupled to the input end 16A of the logic circuit 16. The second reverse circuit 22 is used to provide a signal whether the external apparatus 400 is connected to the automatic power-off circuit 1. When the external apparatus 400 is connected to the automatic power-off circuit 1, it is necessary to stop the battery 100 supplying power to the load 200. Specifically, the second reverse circuit 22 provides a third signal Sc3 reversed to the input voltage Vin based on whether the external apparatus 400 is connected to the automatic power-off circuit 1, and the logic circuit 16 turns off the first switch Q1 according to the third signal Sc3 with the second potential (i.e., the external apparatus 400 is connected). The charging circuit 24 is coupled to the connection port 20 and the battery 100, and converts the input voltage Vin to charge the battery 100. In particular, the charging circuit 24 may be a switching power converter, for example, but not limited to, a bulk converter. In one embodiment, besides the connection port 20 and the charging circuit 24, the other blocks of the automatic power-off circuit 1 may be implemented by logic circuits, electronic component circuits, or programmable control. All components, circuits or program software that may perform the above functions should be included in the scope of different embodiments.

Figure 2:
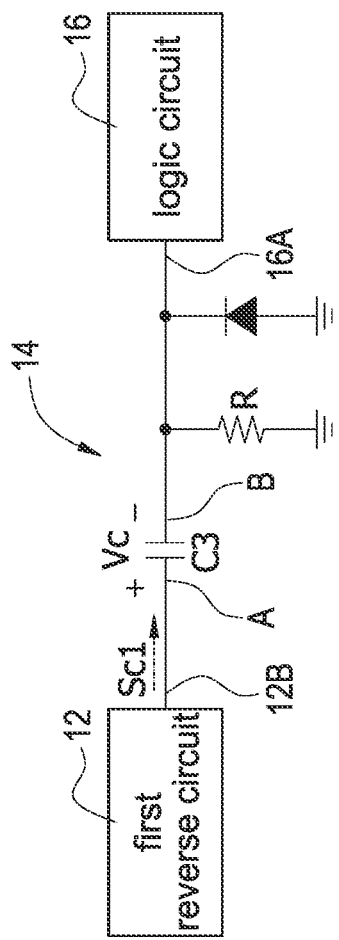
FIG. 2 is a block circuit diagram of a timing circuit according to the present disclosure.

Please refer to FIG. 2, which shows a block circuit diagram of a timing circuit according to the present disclosure, and also refer to FIG. 1. The timing circuit 14 includes a third capacitor C3, a resistor R, and a diode D. The third capacitor C3 has a first end A and a second end B. The first end A of the third capacitor C3 is coupled to the output end 12B of the first reverse circuit 12, and the second end B of the third capacitor C3 is coupled to the input end 16A of the logic circuit 16. The resistor R is coupled to the third capacitor C3 and a ground end, and generates a specific time period based on a principle of RC charge and discharge. Specifically, the third capacitor C3 is charged based on the first signal Sc1 with the first potential so that a voltage across between the first end A and the second end B of the third capacitor C3 (i.e., an across voltage Vc) is gradually generated (built). After the specific time period, the across voltage Vc between the first end A and the second end B of the third capacitor C3 is accumulated enough to make the potential of the second end B become the second potential so that the second signal Sc2 provided by the timing circuit 14 is adjusted to the second potential. Therefore, the time when the cross voltage Vc is charged to a sufficient potential to make the second signal Sc2 drop (reduce) to the second potential is the specific time period. For example, it is assumed that the first potential is 5 volts provided by the first reverse circuit 12. When the third capacitor C3 is not charged yet, the 5-volt first potential is directly provided to the input end 16A of the logic circuit 16. However, when the third capacitor C3 is fully charged, the cross voltage Vc, for example, but not limited to, 4 volts, so that the potential of the second end B becomes 1 volt. Therefore, the potential of the second terminal B drops (reduces) from the original 5 volts to the second potential (i.e., 1 volt) due to the charging of the third capacitor C3.

A cathode of the diode D is coupled to the second end B of the third capacitor C3, and an anode of the diode D is coupled to the ground end. The diode D is used to clamp the potential of the second end B of the third capacitor C3 so as to prevent the potential of the second terminal B from being too low, which may cause the logic circuit 16 to fail. Specifically, after the third capacitor C3 is fully charged, since the potential of the first signal Sc1 becomes the second potential, the both the first end A and the second end B of the third capacitor C3 are in the second potential, and therefore it is possible to make the potential of the second end B be a negative value. If the negative value is too large and exceeds the acceptable input range of the logic circuit 16, it will cause the logic circuit 16 to fail. In this condition, the diode D is forward-biased, and the forward-biased conduction (turned-on) voltage is approximately 0.7 volts (depending on the type of diode) so that even if the potential of the second terminal B becomes negative, it will be clamped at −0.7 volts and will not be too low. In one embodiment, the timing circuit 14 is not limited to be implemented only by the circuit of FIG. 2. Any components, circuits or controllers that can automatically change the signal potential after the specific time period should be included in the scope of this embodiment. For example, but not limited to, the above-described functions may be performed by a programmable controller to provide the specific time period.

Figure 3A:
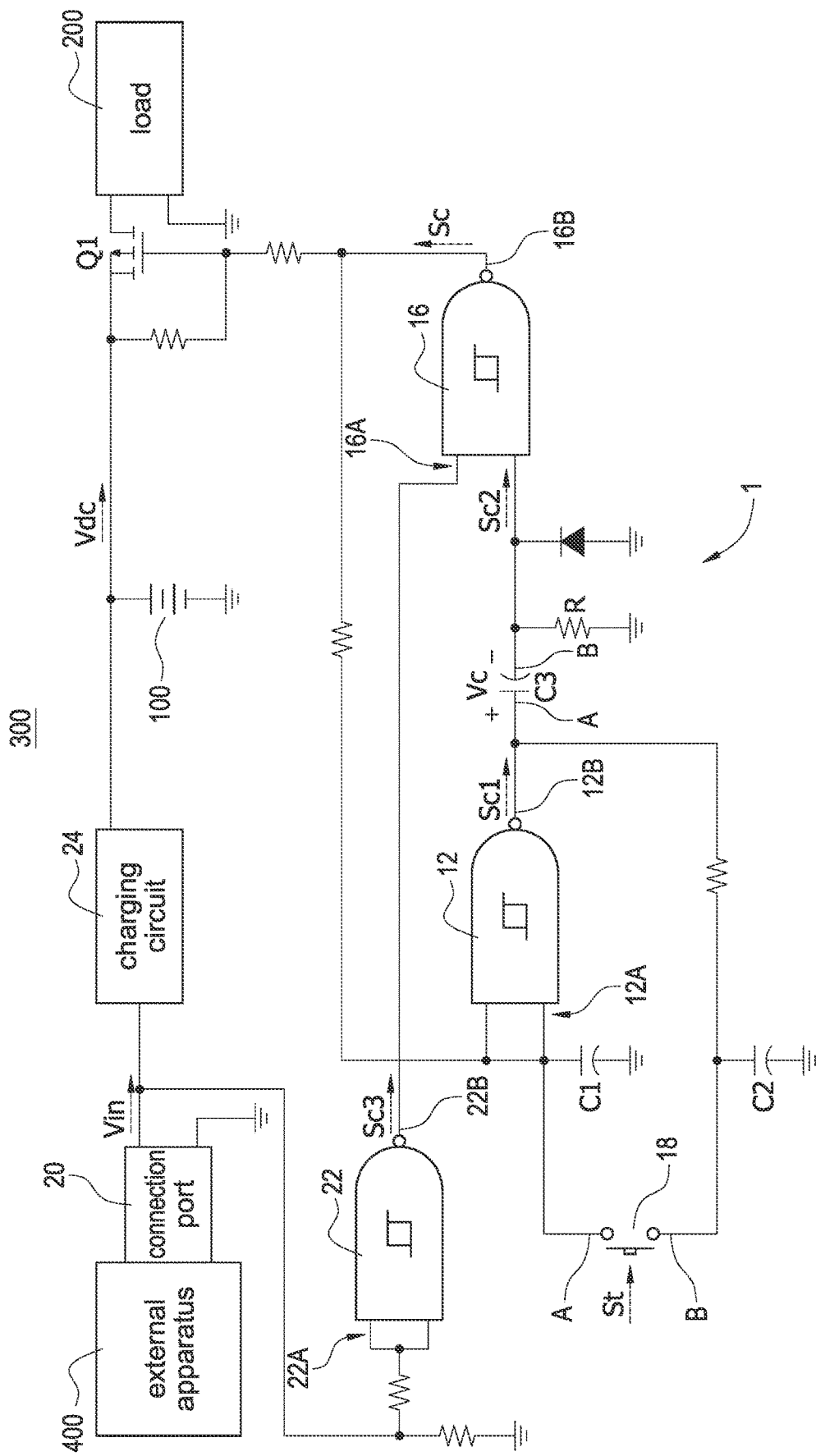
FIG. 3A is a block circuit diagram of the automatic power-off circuit suitable for the washing machine according to a first embodiment of the present disclosure.

Please refer to FIG. 3A, which shows a block circuit diagram of the automatic power-off circuit suitable for the washing machine according to a first embodiment of the present disclosure, and also refer to FIG. 1 to FIG. 2. In one embodiment, the first reverse circuit 12, the second reverse circuit 22, and the logic circuit 16 may be NAND gates, and the first switch Q1 may be a P-channel MOSFET. When the battery 100 is connected, the first capacitor C1 is charged from the second potential (low potential), i.e., an action a. In this condition, the first reverse circuit 12 provides the first potential (high potential) based on the second potential of the first capacitor C1, i.e., an action b. Since the third capacitor C3 of the timing circuit 14 has not been charged yet, the timing circuit 14 provides the second signal Sc2 with the first potential to the logic circuit 16 based on the first signal Sc2 with the first potential, i.e., an action c, so that the logic circuit 16 provides the control signal Sc with the second potential to turn on the first switch Q1 based on the second signal Sc2 with the first potential, i.e., an action d. In this condition, since the third capacitor C3 receives the first signal Sc1 with the first potential, the third capacitor C3 starts to be charged, and therefore the timing circuit 14 starts to time the specific time period, i.e., an action e. When the third capacitor C3 is fully charged, it represents the end of the specific time period. During the specific time period, the timing circuit 14 gradually adjusts the second signal Sc2 from the first potential H to the second potential L. When the potential of the second signal Sc2 is the second potential L, the logic circuit 16 provides the control signal Sc with the first potential H to turn off the first switch Q2 based on the second signal Sc2 with the second potential L, i.e., an action f. Therefore, when the battery 10 is connected to the automatic power-off circuit 1, the motor (i.e., the load 200) rotates (operates) for the specific time period and then stops.

After the first switch Q1 is turned off by the control signal Sc with the first potential, the first capacitor C1 is charged to the first potential, i.e., an action g, so that the first reverse circuit 12 provides the first signal Sc1 with the second potential based on the first capacitor C1 with the first potential, i.e., an action h. Therefore, the potential of the first end A and the potential of the second end B of the third capacitor C3 are changed to the second potential. The diode D clamps the potential of the second end B at −0.7 volts (i.e., the second potential) so that the timing circuit 14 maintains the potential of the second signal Sc2 to be the second potential based on the first signal Sc1 with the second potential, i.e., an action i. In this condition, the potentials of each component and circuit of the automatic power-off circuit 1 are fixed so that the control signal Sc provided by the logic circuit 16 is fixed at the first potential to maintain the first switch Q1 in a turned-off state (i.e., a steady state).

Afterward, when the first switch Q1 is maintained at the turned-off state (i.e., not the specific time period) and the second switch 18 is pressed, the second switch 18 is turned on while receiving the trigger St, i.e., an action i1. In this condition, the first capacitor C1 discharges the second capacitor C2 when the second switch 18 is turned on, and therefore the potential originally stored in the first capacitor C1 is instantly changed to drop (reduce) to the second potential, i.e., an action k1. When the potential of the first capacitor C1 drops to the second potential, the action b is executed (performed) again, and therefore the automatic power-off circuit 1 automatically executes actions c to fin sequence to automatically control the motor to stop or to rotate. Afterward, actions g to f are successively executed to maintain the first switch Q1 in the turned-off state (i.e., the steady state). In one embodiment, a capacitance value of the second capacitor C2 is more than 5 times of that of the first capacitor C1. Therefore, when the first capacitor C1 is coupled to the second capacitor C2, the first capacitor C1 is rapidly charged/discharged under the influence of the second capacitor C2, and the response of the first capacitor C1 to various actions is accelerated.

As shown in FIG. 3A, the second end B of the second switch 18 is coupled to the output end 12B of the first reverse circuit 12 so that the automatic power-off circuit 1 has the function of continuously pressing the second switch 18 to control the fan to stop or to rotate. Specifically, during the specific time period (that is, after the second switch 18 is pressed or after the battery 100 is connected, but before the specific time period ends) and the second switch 18 is pressed, the second switch 18 receives the trigger St and to be turned on turns on (i.e., an action j2). In this condition, the first signal Sc1 with the first potential provided by the first reverse circuit 12 (that is, the potential of the first signal Sc1 is the first potential before the action b to the action h) controls the second capacitor C2 to be charged to the first potential (i.e., an action k2). Since the second capacitor C2 charges the first capacitor C1 when the second switch 18 is turned on, actions g to i are executed regardless of which action b to h. Since the potential of the second signal Sc2 is the second potential in the action i, the logic circuit 16 turns off the first switch Q1 based on the second signal Sc2 with the second potential (i.e., the action f).

When the automatic power-off circuit 1 needs to charge the battery 100, the external apparatus 400 is connected to the connection port 20 so that the automatic power-off circuit 1 receives the input voltage Vin. Afterward, the second reverse circuit 22 receives the input voltage Vin due to the connection of the external apparatus 400, and provides the third signal Sc3 with the second potential based on the input voltage Vin (i.e., an action x), wherein the potential of the third signal Sc3 is reversed to the input voltage Vin. Afterward, the logic circuit 16 provides the control signal Sc with the first potential based on the third signal Sc3 with the second potential to turn off the first switch Q1 (i.e., an action y). In this condition, the charging circuit 24 also receives the input voltage Vin, and converts the input voltage Vin to charge the battery 100 (i.e., an action z). In one embodiment, FIG. 3A shows a detailed description of the components (such as resistors) and their coupling relationships, which are usually used for current limitation or voltage regulation, and are not the main features of the present disclosure, and the detail description is omitted here for conciseness.

Figure 3B:
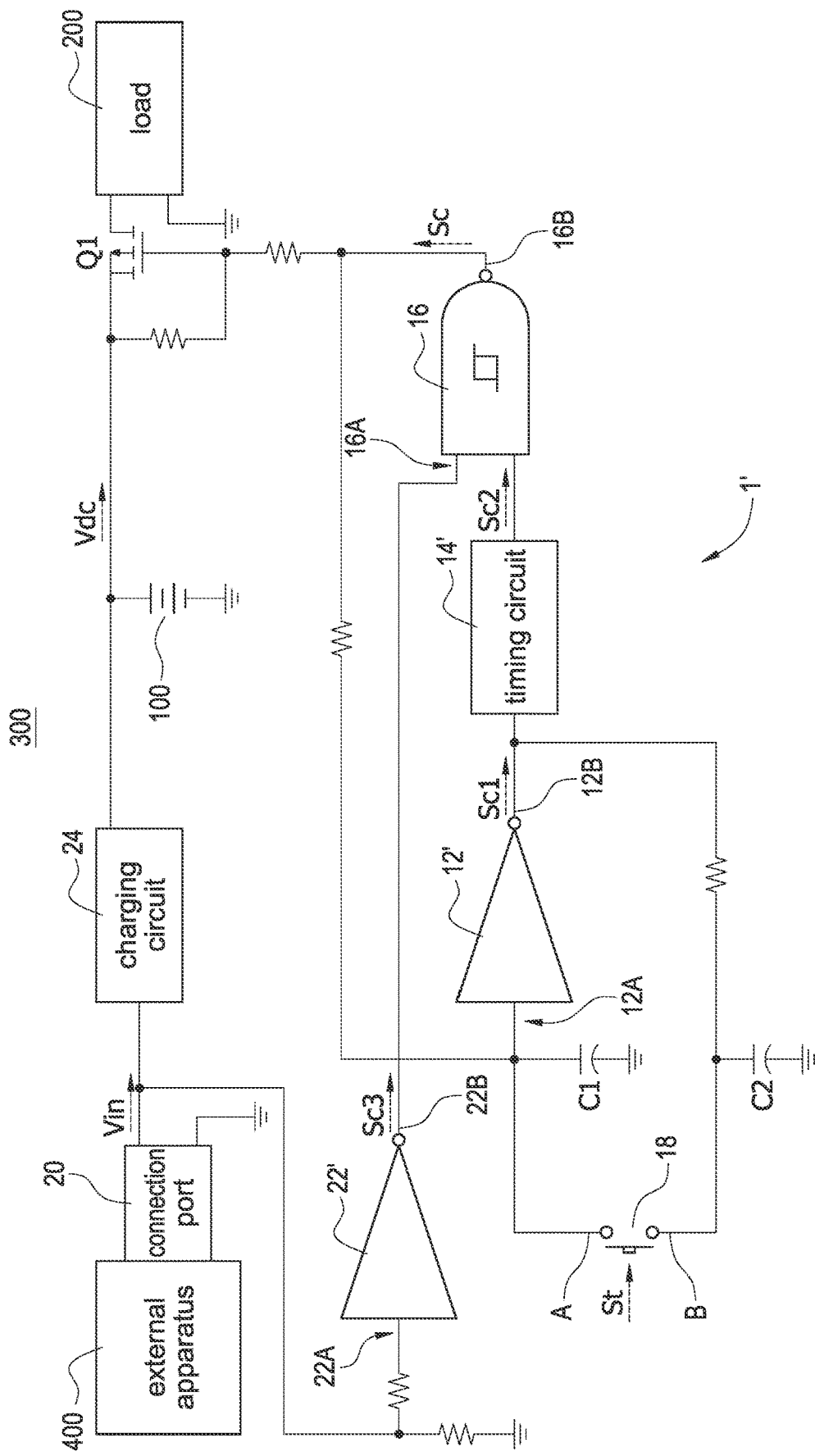
FIG. 3B is a block circuit diagram of the automatic power-off circuit suitable for the washing machine according to a second embodiment of the present disclosure.

Please refer to FIG. 3B, which shows a block circuit diagram of the automatic power-off circuit suitable for the washing machine according to a second embodiment of the present disclosure, and also refer to FIG. 1 to FIG. 3A. The difference between the automatic power-off circuit 1 of FIG. 3A and the automatic power-off circuit 1' of FIG. 3B is that the first reverse circuit 12' and the second reverse circuit 22' may be NOT gates, and the timing circuit 14' may be a controller. Since the first reverse circuit 12, the second reverse circuit 22, and the logic circuit 16 shown in FIG. 3A are NAND gates, the advantage of the circuit structure of FIG. 3A is to save circuit size and circuit cost by using only one NAND controller having three to four NAND gates. In fact, since the first reverse circuit 12 and the second reverse circuit 22 have the function of NOT gate, they can be replaced by NOT gates. In addition, although the timing circuit 14 is a controller, it also has the function of automatic timing. Since the circuit structure of FIG. 3A is simple and the cost of components is low, the timing circuit 14 of FIG. 3A is a preferred embodiment. In one embodiment, although the circuit structure of FIG. 3B is slightly different from that of FIG. 3A, the operations thereof are similar to those of FIG. 3A, and detail description is omitted here for conciseness. In addition, the circuit structures of FIG. 3A and FIG. 3B may be replaced each other according to actual needs, and it is not excluded that conventional circuits, components, or controllers with the same function may be used for replacement.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An automatic power-off circuit, coupled between a battery and a load, and configured to automatically disconnect a path between the battery and the load after the battery supplying power to the load for a specific time period, the automatic power-off circuit comprising:
   a first switch, coupled to the battery and the load;
   a reverse circuit, comprising an input end coupled to the battery, the switch, and a first capacitor, and an output end coupled to a timing circuit, and the first reverse circuit configured to provide a first signal reversed to a potential change based on the potential change of the first capacitor;
   a logic circuit, comprising an input end coupled to the timing circuit, and an output end coupled to the first switch and the reverse circuit; and
   a second switch, comprising a first end coupled to the input end of the reverse circuit, and a second end coupled to a second capacitor, and the second switch be turned on based on a trigger, and a potential of the second capacitor being changed based on the second switch turned-on;
   wherein the timing circuit is configured to provide a second signal with a first potential to the logic circuit based on the first signal with the first potential, and the timing circuit adjusts the second signal with the second potential after the specific time period, and the logic circuit is configured to turn on the first switch based on the second signal with the first potential and turn off the first switch based on the second signal with the second potential.

2. The automatic power-off circuit as claimed in claim 1, further comprises:
   a connection port, configured to couple an external apparatus to receive an input voltage; and
   a second reverse circuit, comprising an input end and an output end; the input end coupled to the connection port, and the output end coupled to the input end of the logic circuit;
   wherein the second reverse circuit provides a third signal reversed to the input voltage based on whether the external apparatus is connected or not, and the logic circuit turns off the first switch based on the third signal with the second potential.

3. The automatic power-off circuit as claimed in claim 2, further comprising:
   a charging circuit, coupled to the connection port and the battery, and configured to convert the input voltage to charge the battery.

4. The automatic power-off circuit as claimed in claim 1, wherein the second end of the second switch is coupled to the output end of the first reverse circuit, and when the second switch is turned on by the trigger during the specific time period, the potential of the second capacitor is changed based on the turned-on second switch.

5. The automatic power-off circuit as claimed in claim 1, wherein the timing circuit comprises:
- a third capacitor, comprising a first end coupled to the output end of the first reverse circuit, and a second end coupled to the input end of the logic circuit; and
- a resistor, coupled to the third capacitor;
- wherein the third capacitor is charged based on the first signal with the first potential, and a voltage across between a first end and a second end of the third capacitor is generated to adjust the second signal with the second potential after the specific time period.

6. The automatic power-off circuit as claimed in claim 5, wherein the timing circuit further comprises:
- a diode, coupled to the second end of the third capacitor, and configured to clamp a potential of the second end of the third capacitor.

7. The automatic power-off circuit as claimed in claim 1, wherein a capacitance of the second capacitor is greater than or equal to five times a capacitance of the first capacitor.

8. The automatic power-off circuit as claimed in claim 1, wherein the logic circuit is a NAND gate, and the first switch is a P-channel transistor.

9. The automatic power-off circuit as claimed in claim 1, wherein the automatic power-off circuit is suitable for a washing machine, and the load is a motor of the washing machine.

10. An automatic power-off method of an automatic power-off circuit, the automatic power-off circuit coupled between a battery and a load, and the automatic power-off circuit comprising a first switch, a first capacitor, a first reverse circuit, a timing circuit, and a logic circuit, the automatic power-off method comprising steps of
- (a) charging the first capacitor from a second potential based on a connection of the battery;
- (b) providing, by the first reverse circuit, a first signal with a first potential based on the first capacitor with the second potential;
- (c) providing, by the timing circuit, a second signal with the first potential to the logic circuit based on the first signal with the first potential;
- (d) turning on, by the logic circuit, the first switch based on the second signal with the first potential;
- (e) timing a specific time period, by the timing circuit, and adjusting the second signal with the second potential after the specific time period; and
- (f) turning off, by the logic circuit, the first switch based on the second signal with the second potential.

11. The automatic power-off method as claimed in claim 10, further comprising steps of
- (g) charging the first capacitor to the first potential;
- (h) providing, by the reverse circuit, the first signal with the second potential based on the first capacitor with the first potential; and
- (i) maintaining, by the timing circuit, the second signal with the second potential based on the first signal with the second potential.

12. The automatic power-off method as claimed in claim 11, wherein the automatic power-off circuit further comprises a second switch and a second capacitor, and the automatic power-off method further comprises steps of:
- (j1) receiving, by the second switch, a trigger and being turned on not during the specific time period;
- (k1) discharging, by the first capacitor, the second capacitor to the second potential based on the turned-on switch; and
- (l1) repeating step (b) to step (f).

13. The automatic power-off method as claimed in claim 12, further comprising steps of:
- (j2) receiving, by the second switch, a trigger and being turned on during the specific time period;
- (k2) providing, by the first reverse circuit, the first signal with the first potential to charge the second capacitor to the first potential; and
- (l2) repeating step (g) to step (i), and executing step (f).

14. The automatic power-off method as claimed in claim 10, wherein the automatic power-off circuit further comprises a second reverse circuit, and the automatic power-off method further comprises steps of:
- (x) receiving, by the second reverse circuit, an input voltage based on a connection of the external apparatus, and providing a third signal with the second potential based on the input voltage; and
- (y) turning off, by the logic circuit, the first switch based on the third signal with the second potential.

15. The automatic power-off method as claimed in claim 14, wherein the automatic power-off circuit further a charging circuit, and the automatic power-off method further comprises a step of:
- (z) converting, by the charging circuit, the input voltage to charge the battery.

* * * * *